United States Patent [19]
Tower

[11] 3,910,764
[45] Oct. 7, 1975

[54] WATER TESTING DEVICE

[76] Inventor: Ronald H. Tower, 1340 Royal Drive, Library, Pa. 15129

[22] Filed: Dec. 23, 1974

[21] Appl. No.: 535,202

[52] U.S. Cl............ 23/253 R; 23/259; 73/425.4 R; 141/83
[51] Int. Cl.² ............ G01N 1/12; G01N 21/06; G01N 31/22; G01N 33/18
[58] Field of Search............. 23/253 R, 259, 292; 73/425.4 R; 141/27, 83

[56] References Cited
UNITED STATES PATENTS
| | | | |
|---|---|---|---|
| 3,692,490 | 9/1972 | Hall | 23/253 R |
| 3,718,435 | 2/1973 | Tower | 23/253 R |

*Primary Examiner*—Robert M. Reese
*Attorney, Agent, or Firm*—Parmelee, Miller, Welsh & Kratz

[57] ABSTRACT

An apparatus for testing water by use of a reagent to determine chemical characteristics such as pH or chlorine content. A chamber is provided to hold a water sample of fixed predetermined amount, and a reservoir or reservoirs are provided for the selected reagents. A mechanical plunger operates a gate which seals the water sample chamber, and also activates a mechanism which forces a predetermined amount of reagent from a reagent measuring chamber into the water sample chamber. Comparison color samples are provided for comparing the color or appearance of the water reagent mixture in the water sample container to determine the presence and amount of the component for which the water is being tested.

7 Claims, 4 Drawing Figures

WATER TESTING DEVICE

BACKGROUND OF THE INVENTION

1. Field of the Invention

The invention relates generally to apparatus for chemical analysis and more specifically to apparatus for testing the chemical characteristics of water in swimming pools or hydroponics, and particularly apparatus of the type which is portable and hand held.

2. Prior Art

It is well known that water in swimming pools and similar enclosed bodies of water must be controlled as to both pH and chlorine content to maintain a healthy environment for persons swimming in the water. Commonly, the pH and chlorine levels are determined by obtaining water samples of known volume in two vials, and then adding a proportionate amount of indicator solution for indicating pH level in one vial, and a proportionate amount of another indicator solution for indicating chlorine content in the other vial. The indicator solutions cause color changes based upon the pH level and chlorine content of the original water sample. This method of pH and chlorine determination is time consuming and may be inaccurate because of necessary dependence on operator skill in filling the vials to the prescribed levels and adding the proper amount of indicator solution. One solution to this problem is shown in applicant's U.S. Pat. No. 3,718,435, which discloses an instantaneous online water tester which is installed in the water recirculation system of the swimming pool and is operated at desired intervals. Although such a device is appropriate for swimming pools having installed water recirculation systems, it is not as readily usable in pools which do not have a fixed water recirculation system, such as movable, above ground pools. A portable water testing apparatus of a somewhat different type is disclosed in U.S. Pat. No. 3,692,490. The present invention is intended to provide means for an accurate determination of water chemistry in bodies of water which do not have permanent water recirculation systems.

SUMMARY OF THE INVENTION

The present invention is a portable water testing device having a body to which are connected at least one water sample chamber of fixed predetermined volume having a closed lower end and an open upper end, and also a reagent reservoir or reservoirs associated with each water sample chamber. The number of water sample chambers depends on the number of tests and type of test of water chemistry to be made, and a separate reagent reservoir or reservoirs must be provided for each water sample chamber. A plunger is mounted to the body and has gate means for each water sample chamber. These gates are movable between a rest position where the open end of each water sample chamber remains open, and a closed position, wherein a gate seals the open end of each water sample chamber. Biasing means are provided which urge the plunger toward the rest position. Means are included for forcing a predetermined amount of reagent from the reagent reservoir or reservoirs into the water sample chamber when the open end of the water sample chamber is sealed. These means are operated by the plunger and preferably include a reagent measuring chamber or chambers associated with each water sample chamber and included in the reagent measuring chamber is an integral mounted piston operated by the plunger. The piston forces a predetermined amount of reagent from the reagent measuring chamber through an orifice into the water sample chamber. Color comparison standards are provided adjacent to the water sample chamber for homogeneous comparison of the color of the sample in the chamber to the standard to determine the presence and amount of the characteristics for which the water is being tested.

DESCRIPTION OF THE PREFERRED EMBODIMENT

Figure 1:
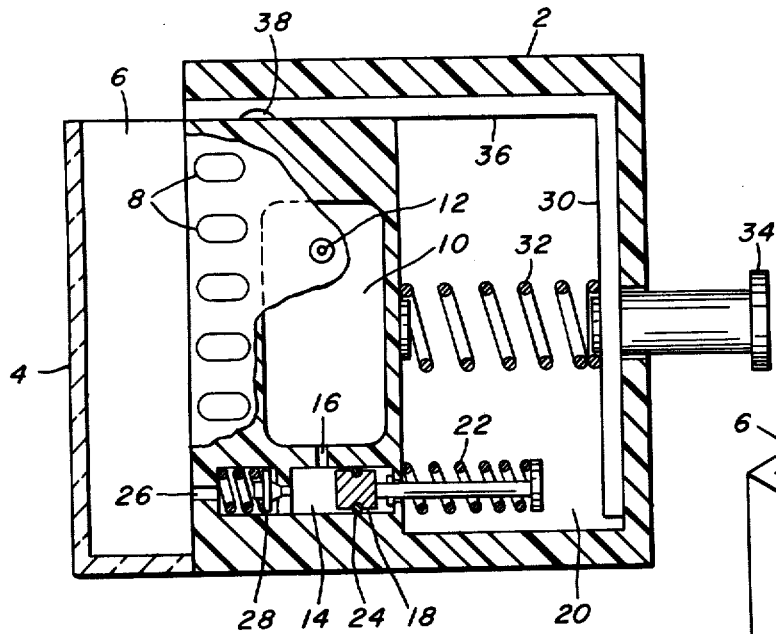
FIG. 1 is a sectional side elevation view of the water testing device of the present invention showing the plunger in the rest position and the gate open.
Figure 3:
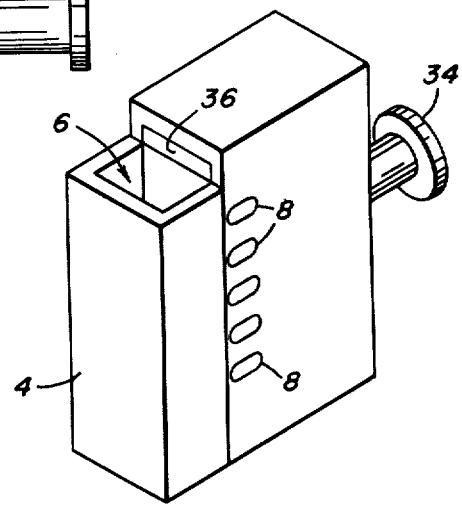
FIG. 3 is a perspective view of one embodiment of the present invention having one water sample chamber.
Figure 2:
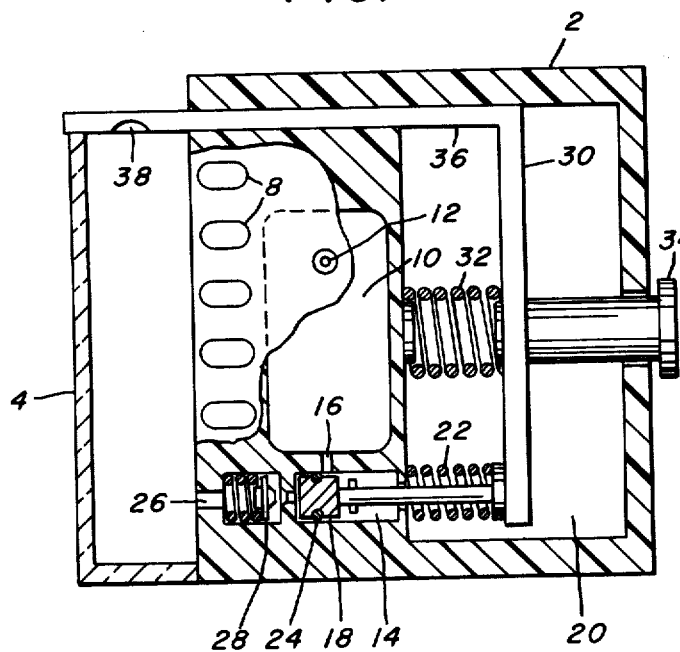
FIG. 2 is a view similar to FIG. 1, showing the plunger in the closed position and the open end of the water sample chamber sealed by the gate.

As shown in FIGS. 1 and 2, the water testing device of the present invention has a body 2 to which is attached at least one water sample chamber 4 having an open top 6. While the present description will be of a device having one water sample chamber, and the other elements associated therewith, it should be noted that the water-testing device may have more than one water sample chamber 4, such as the device shown in FIG. 4 which has two chambers for testing more than one chemical characteristic of the water sample being tested. The water sample chamber 4 is preferably formed from a clear plastic or other clear substance so as to allow the color of the sample to be observed through the wall of the water sample chamber 4. Color comparison standards 8 are preferably included on the body 2 of the water-testing device, allowing for comparison of these standards 8 with the color of the water in the water sample chamber 4 to determine the presence and amount of the component for which the water is being tested.

A reagent reservoir 10 is included within the body 2, either by being formed as a hollow space within the body 2, or as a separately formed chamber which is attached within the body 2. A fill plug 12 is provided in the body 2 so as to allow the reagent reservoir 10 to be filled with an appropriate indicator material or reagent. Appropriate indicating materials would be, for example, phenol red for indicating the pH level, and orthotolidine (OTO) for determining chlorine content. Adjacent to the reagent reservoir 10 is a reagent measuring chamber 14 which is connected to the reagent reservoir 10 by a passage 16. The reagent measuring chamber 14 forms part of a means for forcing a predetermined amount of reagent from the reagent reservoir 10 into the water sample chamber 4 when the open end 6 of the water sample chamber 4 is sealed. This means for measuring and injecting the reagent preferably includes a piston 18 mounted within the reagent measuring chamber 14 and extending into an opening 20 in the body 2, and biasing means such as spring 22 for urging the piston into a position away from the water sample chamber 4. The piston 18 is sealed against the walls of the chamber 14, such as by a seal 24, so that movement of the piston 18 through the reagent measuring chamber 14 will force the contents of the chamber 14 through an injection orifice 26 and into the water sample chamber 4. Means are provided such as one-way valve 28 to prevent any of the contents of the water sample chamber 4 from passing back into reagent measuring chamber 14.

A plunger 30 is mounted in the body 2 and biasing means such as spring 32 are provided to urge the plunger 30 away from the water sample collection chamber 4. The plunger 30 includes a button 34 which extends outside the body 2, and a gate 36 which, when the button 34 is pressed, extends over the open end 6 of the water sample chamber 4 to close the water sample chamber 4 and contain the sample located therein.

In operation, the water testing device is dipped into the swimming pool or other water to be tested so that the water sample chamber 4 fills with a predetermined amount of water. The size of the sample is controlled by the size of the water sample chamber 4, so that the amount of water in the chamber 4 will be a known constant. When the button 34 is pushed, the plunger 30 causes the gate 36 to seal the open end 6 of the water sample chamber 4, and subsequently forces the piston 18 through the reagent measuring chamber 14. This causes a predetermined amount of reagent which has entered the reagent measuring chamber 14 from the reagent reservoir 10 through the passage 16 to be forced past the one-way valve 28 through the injection orifice 26 and into the water chamber 4. An indentation 38 is provided in the gate 36 to allow for the increase in volume of the water sample upon injection of the reagent into the water sample chamber 4. The mixing of the measured amount of reagent with the measured amount of water in the water sample chamber 4 will cause a corresponding color change in the water sample which can then be compared with the color comparison standards 8 to determine the presence and amounts of the components for which the water is being tested. When the comparison has been made, the button 34 is released, causing the plunger 30 to be returned to its original position by the spring 32, and the piston 18 to be returned to its original position by the spring 22. The water sample chamber 4 may then be emptied and the water testing device is ready for the next use.

In instances where a dual reagent composition must be added to a water sample for adequate testing, a pair of reagent reservoirs 10, passages 16, reagent measuring chambers 14, pistons 18, springs 22, seals 24, orifices 26 and valves 28 may be provided for use in connection with a single water sample chamber 4.

Figure 4:
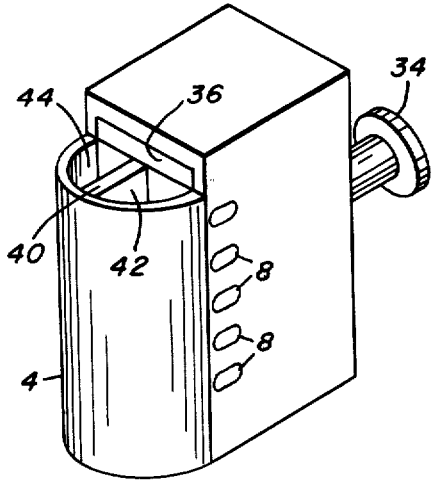
FIG. 4 is a perspective view of another embodiment of the present invention having two water sample chambers.

As mentioned previously, the device may include more than one water sample chamber with simultaneous determination of more than one characteristic of the water being made. As illustrated in FIG. 4, the water chamber 4 may be partitioned, such as by dividing wall 40, into a pair of water chambers 42 and 44. In such a construction, there is provided one reagent reservoir 10 and one reagent measuring chamber 14 associated with each of the water chambers 42 and 44. The pistons 18, located in the reagent measuring chambers 14, will each be operated by a single plunger 30 so that the pushing of the single button 34 will cause the injection of a predetermined measured amount of different reagent into each of the water chambers 42 and 44, allowing simultaneous determination of more than one water characteristic.

There has been described a novel hhnd-held water testing device which provides for accurate measurement of water chemistry with minimum operator knowledge and skill, and which can be used in permanent, portable, or other swimming pools and similar bodies of water.

I claim:

1. A portable, hand-held water testing device, comprising:
   a body, having at least one reagent measuring chamber formed therein;
   at least one water sample chamber attached to the body, each water sample chamber having an open upper end and a closed lower end, one water sample chamber being associated with and in communication with a reagent measuring chamber;
   at least one reagent reservoir, one reagent reservoir being associated with and in communication with each reagent measuring chamber;
   a plunger, mounted to the body and having at least one movable gate connected thereto, the number of gates corresponding to the number of water sample chambers, said plunger being movable between a closed position wherein a gate seals the open end of each water sample chamber, and a rest position wherein said water sample chamber remains open;
   biasing means which urge the plunger toward the rest position; and
   means operated by the plunger for forcing a predetermined amount of reagent from the reagent measuring chamber into the water sample chamber when the open end of the water sample chamber is sealed.

2. The portable, hand-held water testing device defined in claim 1 having one water sample chamber, one reagent measuring chamber, and one reagent reservoir.

3. The portable, hand-held water testing device defined in claim 1 having two water sample chambers, two reagent measuring chambers, and two reagent reservoirs.

4. The portable, hand-held water testing device defined in claim 1 wherein each reagent reservoir is formed within the body.

5. The portable, hand-held water testing device defined in claim 1 wherein each reagent reservoir is attached to the body.

6. The portable, hand-held water testing device defined in claim 1 wherein the means for forcing reagent into the water sample chamber comprises:
   a piston mounted within the reagent chamber and operably connected to the plunger such that movement of the plunger to the closed position forces the piston through the reagent chamber, thereby forcing reagent from the reagent measuring chamber into the water sample chamber; and
   biasing means connected to the piston which urges the piston away from the water sample chamber.

7. The portable, hand-held water testing device defined in claim 6 wherein the biasing means is a spring.

* * * * *

UNITED STATES PATENT OFFICE
CERTIFICATE OF CORRECTION

PATENT NO. : 3,910,764
DATED : October 7, 1975
INVENTOR(S) : Ronald H. Tower

It is certified that error appears in the above-identified patent and that said Letters Patent are hereby corrected as shown below:

Column 1, line 54, insert --one-- before "gate";

Column 4, line 6, "hhnd-held" should read --hand-held--;

Column 4, line 31, "said" should read --each--.

Signed and Sealed this thirteenth Day of April 1976

[SEAL]

Attest:

RUTH C. MASON
*Attesting Officer*

C. MARSHALL DANN
*Commissioner of Patents and Trademarks*